Aug. 9, 1960  A. S. GILL, JR., ET AL  2,948,548
VEHICLE SUSPENSION LOAD COMPENSATOR
Filed Jan. 24, 1956  2 Sheets-Sheet 1
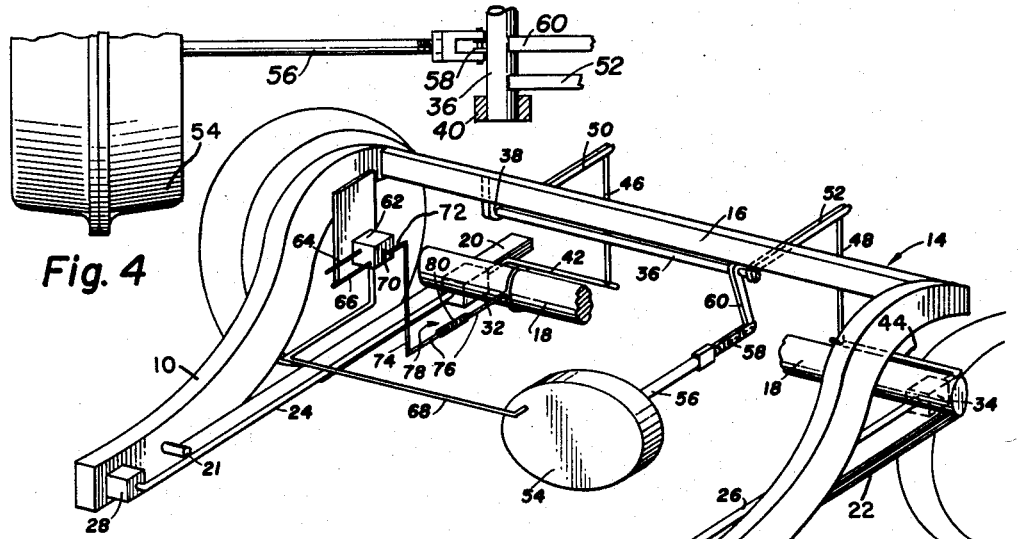
Fig. 4
Fig. 1
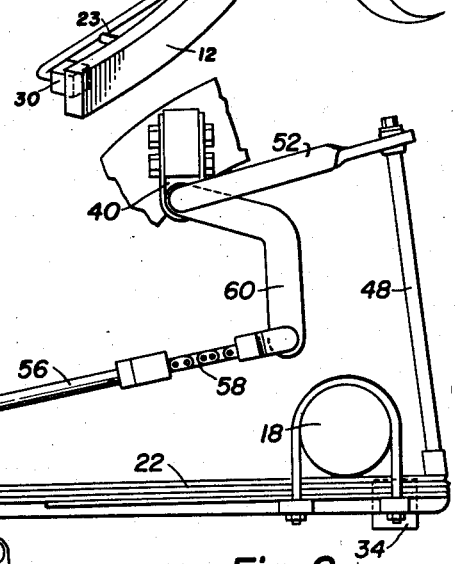
Fig. 2
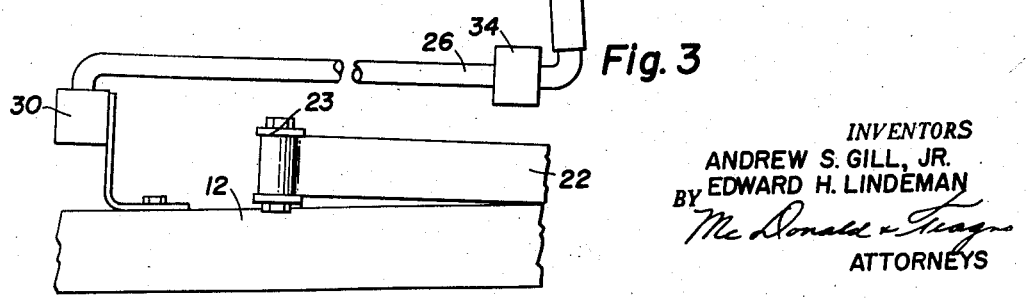
Fig. 3
INVENTORS
ANDREW S. GILL, JR.
EDWARD H. LINDEMAN
BY
ATTORNEYS

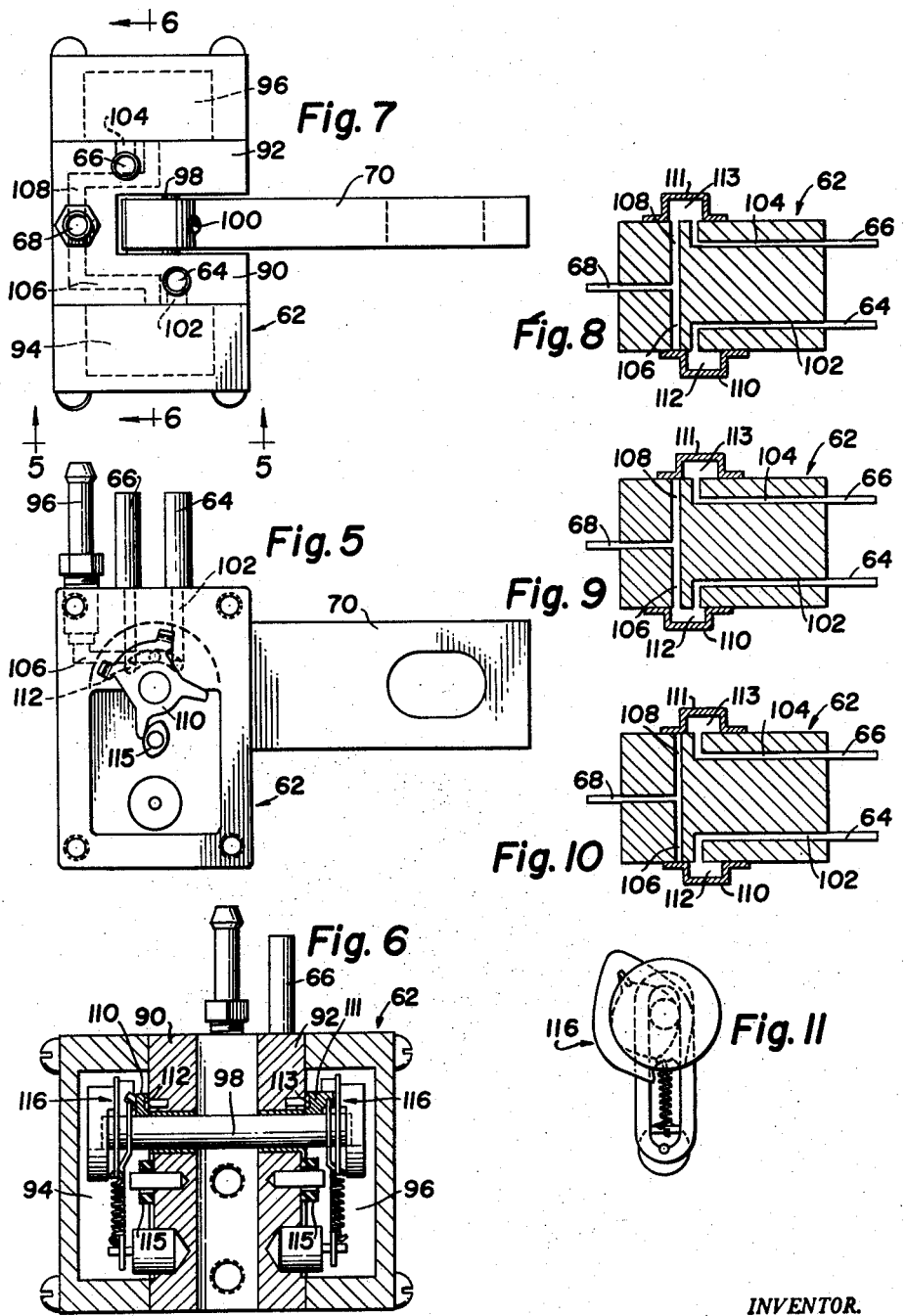

United States Patent Office 2,948,548
Patented Aug. 9, 1960

2,948,548

VEHICLE SUSPENSION LOAD COMPENSATOR

Andrew S. Gill, Jr., South Euclid, Ohio, and Edward H. Lindeman, Detroit, Mich., assignors to Eaton Manufacturing Company, Cleveland, Ohio, a corporation of Ohio Filed Jan. 24, 1956, Ser. No. 561,096

11 Claims. (Cl. 280—124)

This invention relates to automotive vehicles and more particularly to spring suspensions therefor.

Broadly this invention comprehends the provision of a mechanism incorporating the combined features of a tie rod, anti-sway bar and auxiliary spring and includes a pair of elongated torsional spring members disposed and extending longitudinally from fixed anchors at corresponding points at respective sides of a vehicle and interconnected by a variable position transverse member for transfer of torsional forces therebetween in response to relative movements between body and axle of the vehicle at respective sides thereof. Relative movements between body and axle at one side of the vehicle urge similar relative movements at the other side of the vehicle through the interconnection to provide smooth and even movement of the vehicle over irregular road surfaces. A pivot block provided for maintaining the position of each of the spring members while allowing rotary movement thereof is fixed to the axle. Each rod by virtue of its position and respective attachments functions as a tie rod to resist "wind-up" of the axle that tends to occur during acceleration or deceleration of the vehicle. Also the variation of position of the transverse member is effective to alter the spring tension to provide in effect a variable auxiliary vehicle spring.

In the past many arrangements have been devised to improve the riding qualities of automotive vehicles. While many of these arrangements have been in large measure effective in accomplishing their intended purpose they have been so impractical due to complexity and cost as to render the same unattractive to vehicle owners. In the present invention simplicity and effectiveness are provided in a device adaptable to improve the suspension and riding qualities in several ways.

It is accordingly an object of this invention to provide an auxiliary suspension device that is simple, effective and economical and that improves the riding qualities of vehicles to which applied.

It is a further object of this invention to provide an auxiliary suspension device for vehicles that minimize sway thereof due to relative movement between axle and body thereof.

It is a further object of this invention to provide an auxiliary suspension device for vehicles that minimizes axle "windup" during acceleration or deceleration of the vehicle.

It is a still further object of this invention to provide an auxiliary suspension device for vehicles that provides additional spring support for the vehicle and automatic control load responsive means therefor effective to maintain constant the axle to frame clearance and thus afford continued riding comfort over a great range of load to be carried by the vehicle.

It is a still further object of this invention to provide an auxiliary suspension device that is automatically rendered operative to incorporate features of anti-sway, anti-axle "windup" and auxiliary spring suspension in respone to either sway, axle "windup" or load. Other and further objects and advantages will become apparent from a consideration of the following detailed description taken with the accompanying drawings in which:

Fig. 1 shows in perspective view the overall arrangement of this invention as applied to an automotive vehicle;

Fig. 2 shows a portion of the invention as seen from one side thereof;

Fig. 3 shows in plan view a portion of the torsion rod anchoring and pivot supporting means;

Fig. 4 shows in plan view a portion of the spring loading apparatus forming a part of the invention;

Figs. 5, 6 and 7 show three views in orthogonal projection of a control valve forming a part of the invention;

Figs. 8, 9 and 10 show schematically three views of the possible valve conditions provided by the control valve of Figs. 5, 6 and 7; and Fig. 11 shows a snap-action mechanism forming a part of the control valve shown in Figs. 5, 6 and 7.

Referring now to the drawings for a detailed description of the invention 10 and 12 represent respective longitudinal members of a body frame 14 and 16 represents a frame cross member extending between the longitudinal members and being attached thereto. An axle frame 18 shown only partially in Fig. 1 is provided transversely of the frame members in conventional manner. The frame 14 is supported on axle 18 by a pair of leaf springs 20 and 22, each spring being connected at one end to the adjacent frame member by shackles 21 and 23 and being secured to axle frame 18 intermediate the length of the spring in conventional manner by a U-bolt connection as shown more clearly in Fig. 2. Other connections and components of conventional kind are not shown since it is essential only to disclose the function of this invention with respect to the body frame and axle housing of the vehicle as shown.

A pair of torsional spring bars 24 and 26 are provided, fastened at their forward ends at respective sides of the vehicle by a pair of anchor blocks 28 and 30 and each extends rearwardly therefrom through respective pivot blocks 32 and 34 fastened to the axle U-bolt behind axle 18 as shown more clearly in Fig. 2. Pivot blocks 32 and 34 are fixed in position and prohibit relative radial movements of the bars with respect to the axle 18 while permitting complete freedom in rotary movement about the bar axes as caused by relative movement between the frame 14 and the axle 18.

Torsional stresses created in either one of the torsion bars are transferred to the other of the torsion bars through a linkage including a cross bar 36 pivotally supported by bearings in a pair of spaced bearing brackets 38 and 40 along transverse frame member 16 and two triads of mutually orthogonal arms 42, 44, 46, 48, 50 and 52 located between the ends of the bar 36 and rear ends of the torsion bars. Each juncture between member arms of the triads of arms is provided with a pair of flexible bushings, such as rubber, as shown more clearly in Fig. 2 to provide a limited flexibility to juncture of the arms to accommodate a certain amount of "play" involved in the movement thereof.

The rotary position of cross bar 36 is determined by the stresses in torsion bars 24 and 26 and is further determined as adjusted by vacuum chamber apparatus 54 having a movable diaphragm, not shown, operating through a linkage including an arm 56, chain 58, arm 60 and other appropriate connections. Vacuum chamber and diaphragm 54 are effective to draw arm 56 and chain 58 forwardly to rotate arm 60 and bar 36 and through described linkages to pre-stress torsion bars 24 and 26. Arms 52 and 60 are appropriately attached to bar 36 as by a weld as shown in Fig. 4.

Vacuum chamber 54 is evacuated as controlled by a vacuum control valve 62 which communicates with a source of vacuum, not shown, through a conduit 64, with atmosphere through conduit 66 and with vacuum chamber 54 through a conduit 68. Valve 62 is mounted on frame member 10 so as to move therewith relative to axle 18. Vertical movements of valve 62 relative to axle 18 are effective through a linkage including arms 70, 72, 74 and a bi-partite arm 76 connected at one end to axle 18, to actuate the valve mechanism to selectively provide communication between vacuum chamber 54 and the vacuum source, between chamber 54 and atmosphere or to isolate chamber 54 from any communication at all after communication is mentioned so as to adjustably position and maintain cross bar 36. Arm 76 is provided with a "broken back" connection 78 comprising a coil spring 80 wound about a portion of each section of arm 76 to avoid the transfer of quick or jerky motions.

For a more detailed description of control valve 62 reference is had to Figs. 5 through 11 wherein 90 and 92 represent a pair of section walls dividing valve 62 into a pair of opposed chambers 94 and 96 for receiving snap-action valve mechanisms. Extending between and into each of chambers 94 and 96 is a shaft 98 oscillatable in suitable bushings in walls 90 and 92. Shaft 98 extends through a hole in one end of valve actuating arm 70 and a rigid connection is provided by a locking set screw 100 in a well known manner.

Communication is provided from vacuum source conduit 64 to chamber 94 via channel 102, from atmosphere vent conduit 66 to chamber 96 via channel 104 and from vacuum diaphragm conduit 68 to each of chambers 94 and 96 via respective channels 106 and 108. Communication is selectively provided between the channels 102 and 106 or 104 and 108 or between neither as desired by the operation of a pair of snap-action valve mechanisms located respectively in chambers 94 and 96. The valve mechanisms comprise corresponding oscillatable valves 110 and 111 mounted on opposite ends of shaft 98. Valve 110 has an arcuate recess 112 therein adaptable in one position of the valve to overlap and provide communication between channels 102 and 106 and in another position to prevent such communication and close channel 106. Vale 111 has an arcuate recess 113 therein adaptable in one position of the valve to overlap and provide communication between channels 104 and 108 and in another position to prevent such communication and close channel 108. Valves 110 and 111 are each limited in movement by a pair of arms engageable with a suitable "stop" 115. The action of valves 110 and 111 is such that in response to rotation of shaft 98 the valves successively operate so that the first moves from valve open position to valve closed position or vice versa in response to a further rotation of shaft 98. This is illustrated in Figs. 8, 9 and 10 wherein Fig. 8 shows communication between the vacuum conduit 68 of the diaphragm and the atmosphere conduit 66. In response to movement of arm 70 and rotation of shaft 98 the snap-action of valves 110 and 111 as controlled by snap action mechanism 116, of conventional design utilized in vacuum windshield wiper mechanisms produces the situation shown in Fig. 9 wherein communication is provided between vacuum source conduit 64 and the vacuum conduit 68 for the diaphragm. Fig. 10 shows the situation after the operation of snap action valve 110 but before the action of the valve 111 to provide a condition of no communication between vacuum conduit 68 of the diaphragm and either the atmosphere or vacuum source.

It is to be noted that with the vehicle unloaded and frame 14 at normal height there is no connection between either atmosphere or vacuum supply and the vacuum chamber as is represented by the valve positions shown in Fig. 10. When a predetermined load is applied to frame 14 the height of the car will fall below normal and the valve 110 will open to provide communication between vacuum source and vacuum chamber to draw arm 56 forwardly and through the described linkages pre-stress torsion bars 24 and 26 to effectively provide additional load carrying springing to the suspension system and to elevate and restore the frame to normal height. This operation is effected by reason of the movement of linkage 70, 72, 74 and 76 resulting from movement of the frame relative to the axle and wherein arm 70 as a last link in the linkage acts to rotate shaft 98 and the snap action valve mechanisms coupled therewith. When the normal or neutral level is achieved the vacuum source will be cut off since arm 70 and shaft 98 operate valve 110 to close. If however, the load is removed, valve 11 will be actuated by the linkage including arm 70 since frame 14 will rise with respect to axle 18 to provide communication between the chamber of diaphragm 54 and atmospheric conduit 66 to bleed air into the diaphragm until neutral position is achieved when the valve 111 again operates to close off the communication.

It is thus seen that the present invention automatically provides the proper spring rate according to the load carried by the vehicle and additionally is operative as an anti-sway mechanism for minimizing the effects of momentary deflections of axle 18 with respect to frame 14 since such deflections are instantaneously operative to produce like deflections on the other side of the vehicle. Also, as mentioned hereinabove, by virtue of the fixed anchors of bars 24 and 26 at the longtudinal frame members and at axle 18, axle "windup" is minimized since the bars have sufficient stiffness to restrain any such tendency of the axle. The invention is to be interpreted accordingly as set forth in the appended claims.

What we claim is:

1. A spring suspension system for a vehicle having a frame, a pair of spaced wheels, an axle connecting said wheels, a pair of torsion bars extending longitudinally adjacent respective sides of said frame, one end of each of said bars being affixed to said frame, the other ends of each of said bars being oscillatable about an axis proximate said axle but being spacially affixed with respect thereto, means including a transversely situated cross bar for applying stresses of either torsion bar to the other and further means including power means and valve means responsive to the relative positions of said frame and said axle to adjust the initial stresses in said torsion bars.

2. A spring suspension system for a vehicle having a frame, a pair of spaced wheels connected by an axle, a pair of torsion bars extending longitudinally adjacent respective sides of said frame, one end of each of said bars being rigidly attached to said frame and the other end of each of said bars being pivotally attached to said axle for oscillation about the bar axes, means including a pivotal cross bar and a linkage from each end of the cross bar to respective pivotal ends of said torsion bars for transferring stresses between said torsion bars, further means including a power means and a control valve means responsive to the vertical spacing between said frame and said axle for varying the initial stress in each of said torsion bars.

3. A spring suspension system for a vehicle having a frame and a pair of spaced wheels connected by an axle comprising a pair of torsion bars each having one end connected to said frame and extending longitudinally to said frame, means pivotally securing the other ends of said bars to said axle, a cross bar pivotally mounted transversely of said frame, a linkage connecting each end of said cross bar to a pivotal end of the torsion bars, power means for actuating said cross bar and linkage, means coupling said power means to said cross bar, and valve means operable upon relative movement between said frame and axle for controlling the operation of said power means effective to maintain said spacing between said frame and axle.

4. A spring suspension system for a vehicle having a pair of spaced wheels connected by an axle and a frame having a predetermined spacing from said axle comprising a pair of torsion bars extending longitudinally adjacent respective sides of said frame, one end of each of said bars being rigidly attached to said frame and the other ends of each of said bars being secured to said axle for oscillation about the bar axes, a cross bar transversely and pivotally mounted on said frame and having each end thereof linked to one of said torsion bars to effect a transfer of stresses between said torsion bars, a vacuum chamber having a movable diaphragm, a flexible linkage interconnecting said diaphragm and said cross bar adaptable for adjustably pivoting said cross bar in one sense, valve means mounted on said frame and having an operating mechanism linked to said axle, said valve mechanism being responsive to decreases in spacing between said frame and said axle to provide communication between said chamber and a vacuum source and to increase the stress on said torsion bars, and being responsive to increases in spacing between said frame and axle to provide communication between said chamber and atmosphere to decrease the stress on said torsion bars whereby said predetermined spacing between said frame and axle is maintained.

5. A spring suspension system adapted for use with a vehicle having a frame, and axle connected and spaced apart wheels, comprising a pair of torsion bars extending longitudinally adjacent respective sides of said frame, with one end of each of said bars being affixed to said frame, said bars being pivotally supported on said axle intermediate the opposite ends of said axle, a cross bar extending longitudinally of the axle being pivotally supported about its axis, and linkage means interconnecting the ends of the cross bar respectively to each of the other ends of said torsion bars, power means connected to said cross bar for the actuation thereof, and the linkage means and torsion bars, and means responsive to vertical relative movement between the axle and frame for controlling the operation of the power means.

6. A spring suspension system according to claim 5 wherein each of said torsion bars includes integrally connected angularly offset arms with one end of one arm connected to said frame and with said one arm being pivotally supported on said axle for permissible oscillation about said axis of said one arm, and with one end each of the other arms connected to one end of one portion of said linkage means.

7. A spring suspension system according to claim 6 wherein said one end of each of said linkage portions has a relative movement connection with each of said other arms, and wherein the other end of each of said linkage portions is rigidly secured to said cross bar for movement therewith.

8. A spring suspension system according to claim 7 wherein said cross bar is pivotal about its longitudinal axis, wherein the power means as controlled for operation acts to oscillate the cross bar about its longitudinal axis, and wherein the oscillations of said cross bar are transmitted by the linkage means to oscillate said torsion bars about the axis of said one arm of each torsion bar.

9. In a motor vehicle including a load carrying body and a pair of spaced wheels, means supporting said wheels in axially spaced relation, resilient means interposed between said body and said wheel supporting means, a combination sway stabilizer and torsionally deflectible means connected between said body and wheel supporting means, said sway stabilizer including a pair of longitudinally extending torsion bars, each having one end fixed to said body and the other end connected to a lever arm and said wheel supporting means being pivotally connected to said torsion bars at a position spaced from said one end of each of said bars so that each of said bars moves vertically with said wheel supporting means, a transversely extending bar rotatably mounted on said vehicle, lever arms connected to the ends of said bar, link means connecting one of said longitudinally extending torsion bar lever arms to one of said transversely extending bar lever arms, and similar link means connecting the other of said longitudinally extending torsion bar lever arms to the other of said transversely extending bar lever arms.

10. A spring suspension system for a vehicle having a frame, means connecting an axle means to said frame, a pair of spaced wheels rotatably connected to said axle means, said first mentioned means comprising a first torsion bar torsionally fixed at one end to said frame and pivotally connected to said axle means at a position spaced from said one end of said first torsion bar so that said torsion bar moves vertically with said axle means but is free to rotate with respect to said axle means about the torsional axis of said bar, a second torsion bar torsionally fixed at one end to said frame and pivotally connected to said axle means at a position spaced from said one end of said second torsion bar so that said second bar moves vertically with said axle means but is free to rotate with respect to said axle means about the torsional axis of said second bar, reaction lever means torsionally connected to the other end of each of said torsion bars, and means connecting said reaction lever means to said frame.

11. A spring suspension system for a vehicle having a frame, means connecting an axle means to said frame, a pair of spaced wheels rotatably connected to said axle means, said first mentioned means comprising a first torsion bar torsionally fixed at one end to said frame and pivotally connected to said axle means at a position spaced from said one end of said first torsion bar so that said torsion bar moves vertically with said axle means but is free to rotate with respect to said axle means about the torsional axis of said bar, a second torsion bar torsionally fixed at one end to said frame and pivotally connected to said axle means at a position spaced from said one end of said second torsion bar so that said second bar moves vertically with said axle means but is free to rotate with respect to said axle means about the torsional axis of said second bar, reaction lever means torsionally connected to the other end of each of said torsion bars, means including a power means operatively connected to said reaction lever means, and control means responsive to the relative position of said frame with respect to said axle to operate said power means to adjust the initial stress in each of said torsion bars.

References Cited in the file of this patent
UNITED STATES PATENTS

| 2,733,934 | Muller | Feb. 7, 1956 |
| 2,760,785 | Kolbe | Aug. 28, 1956 |

FOREIGN PATENTS

| 1,079,671 | France | Dec. 1, 1954 |
| 715,426 | Great Britain | Sept. 15, 1954 |